(12) United States Patent
Morinaga et al.

(10) Patent No.: US 8,161,566 B2
(45) Date of Patent: Apr. 17, 2012

(54) TRANSMISSION/RECEPTION SYSTEM, RECORDING APPARATUS AND METHOD, PROVIDING APPARATUS AND METHOD, AND PROGRAM

(75) Inventors: Takeo Morinaga, Kanagawa (JP); Ichiro Hamada, Kanagawa (JP)

(73) Assignee: Sony Corporation (JP)

( * ) Notice: Subject to any disclaimer, the term of this patent is extended or adjusted under 35 U.S.C. 154(b) by 1143 days.

(21) Appl. No.: 11/589,511

(22) Filed: Oct. 30, 2006

(65) Prior Publication Data

US 2007/0107066 A1    May 10, 2007

(30) Foreign Application Priority Data

Oct. 31, 2005    (JP) ................. P2005-316220

(51) Int. Cl.
*H04L 29/06*    (2006.01)
(52) U.S. Cl. .......... 726/31; 380/201
(58) Field of Classification Search .......... 726/26, 726/31, 7, 27, 32; 380/201
See application file for complete search history.

(56) References Cited

U.S. PATENT DOCUMENTS

| | | | |
|---|---|---|---|
| 6,687,802 B1 * | 2/2004 | Kori et al. ............ | 711/163 |
| 6,834,348 B1 * | 12/2004 | Tagawa et al. ............ | 713/193 |
| 7,454,621 B2 * | 11/2008 | Maes et al. ............ | 713/176 |
| 2003/0012375 A1 * | 1/2003 | Sako et al. ............ | 380/59 |
| 2003/0110132 A1 | 6/2003 | Sako | |
| 2004/0028228 A1 | 2/2004 | Hamada et al. | |
| 2006/0067530 A1 * | 3/2006 | Noguchi et al. ............ | 380/203 |

FOREIGN PATENT DOCUMENTS

| | | |
|---|---|---|
| EP | 1229425 A1 | 8/2002 |
| EP | 1517558 A1 | 3/2005 |
| JP | 2003-016725 | 1/2003 |
| JP | 2004-336576 A | 11/2004 |

OTHER PUBLICATIONS

European Search Report EP 06255515, dated Feb. 14, 2011.

* cited by examiner

*Primary Examiner* — Michael Pyzocha
*Assistant Examiner* — Ali Abyaneh
(74) *Attorney, Agent, or Firm* — Lerner, David, Littenberg, Krumholz & Mentlik, LLP

(57) ABSTRACT

A transmission/reception system includes a providing apparatus and a recording apparatus. The providing apparatus has a generating section which generates restrictive information for each piece of content to be broadcast, and a providing section which provides the restrictive information by broadcasting to the recording apparatus. The recording apparatus has a management section which manages the restrictive information, and a restriction section that adds a restriction to at least one of a next copying of the same content as copied last or each piece of the recorded content that provided a source of the copying.

6 Claims, 9 Drawing Sheets

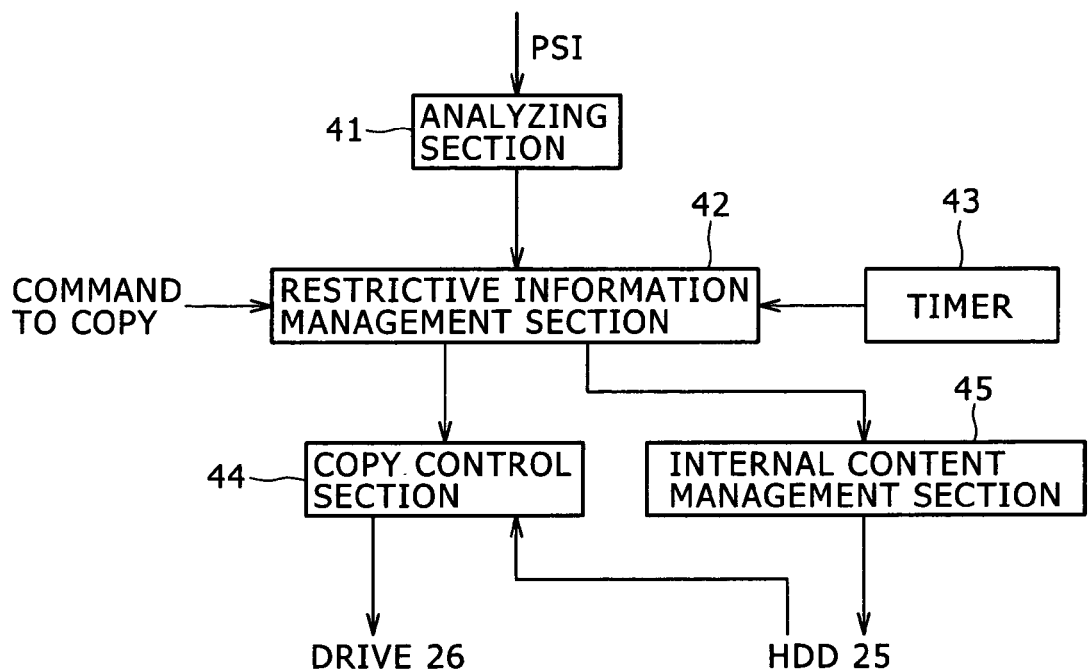

FIG. 4

| ATTRIBUTE | VALUES AND RESTRICTIONS |
|---|---|
| ATTRIBUTE 1 | 1=ONE TIME<br>2=TWO TIMES<br>3=THREE TIMES<br>⋮ |
| ATTRIBUTE 2A | 0=NOT RESTRICTED<br>1=AFTER ONE COPY, A SPECIFIED CONDITION IS ADDED TO COPY DISABLED TIME.<br>2=AFTER TWO COPIES, A SPECIFIED CONDITION IS ADDED TO COPY DISABLED TIME.<br>⋮ |
| ATTRIBUTE 2B | 0=NOT RESTRICTED<br>1=ONE HOUR<br>2=ONE DAY<br>3=ONE WEEK<br>⋮ |
| ATTRIBUTE 3A | 0=NOT RESTRICTED<br>1=AFTER ONE COPY, A CONDITION IS ADDED TO COPY QUALITY.<br>2=AFTER TWO COPIES, A CONDITION IS ADDED TO COPY QUALITY.<br>⋮ |
| ATTRIBUTE 3B | 0=NOT RESTRICTED<br>1=BIT RATE LESS THAN **bps<br>2=RESOLUTION LESS THAN 640×480<br>⋮ |

FIG. 5

| ATTRIBUTE | VALUES AND RESTRICTIONS |
|---|---|
| ATTRIBUTE 4A | 0=NOT RESTRICTED<br>1=AFTER ONE COPY, A CONDITION IS ADDED TO INTERNAL CONTENT HOLDING TIME.<br>2=AFTER TWO COPIES, A CONDITION IS ADDED TO INTERNAL CONTENT HOLDING TIME.<br>⋮ |
| ATTRIBUTE 4B | 0=NOT RESTRICTED (ETERNITY)<br>1=DECREASE HOLDING TIME TO ONE MONTH.<br>2=DECREASE HOLDING TIME TO ONE WEEK.<br>3=DECREASE HOLDING TIME TO ONE DAY.<br>⋮ |
| ATTRIBUTE 5 | 0=NOT RESTRICTED<br>1=AFTER STORAGE, DECREMENT COPYABLE COUNT INDICATED BY ATTRIBUTE 1 BY 1 EVERY MONTH.<br>2=AFTER STORAGE, DECREMENT COPYABLE COUNT INDICATED BY ATTRIBUTE 1 BY 1 EVERY WEEK.<br>3=AFTER STORAGE, DECREMENT COPYABLE COUNT INDICATED BY ATTRIBUTE 1 BY 1 EVERY DAY.<br>⋮ |

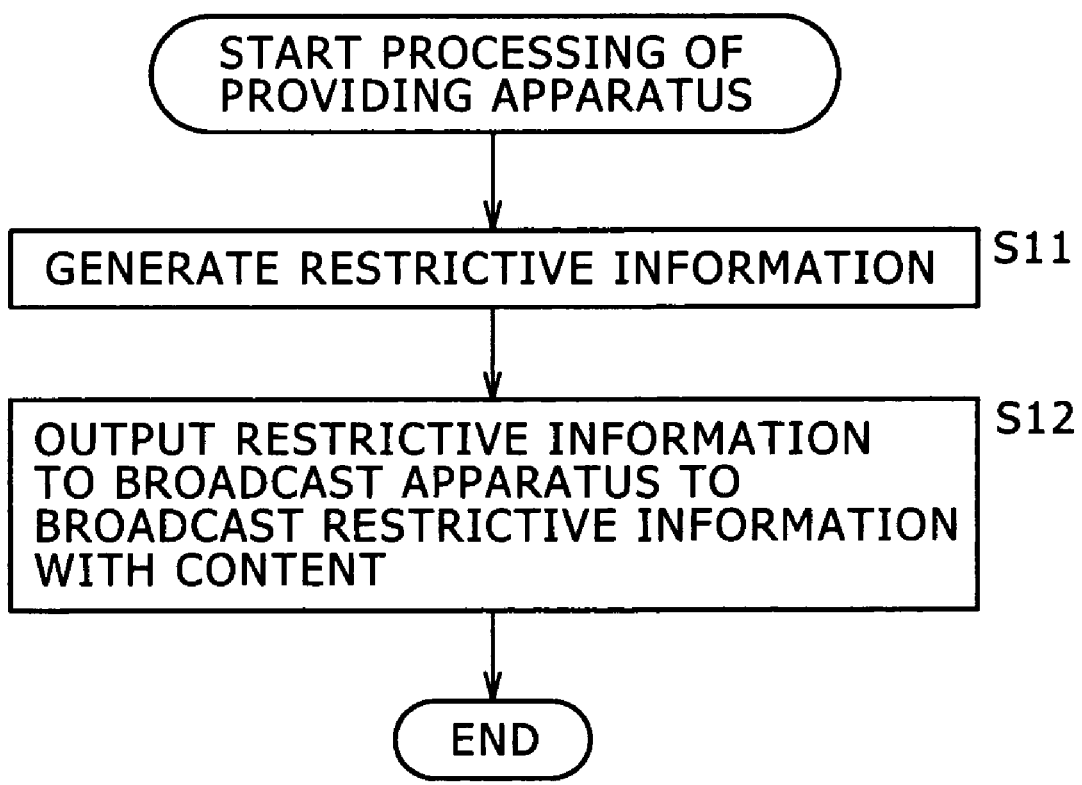

TRANSMISSION/RECEPTION SYSTEM, RECORDING APPARATUS AND METHOD, PROVIDING APPARATUS AND METHOD, AND PROGRAM

CROSS-REFERENCE TO RELATED APPLICATIONS

The present application claims priority from Japanese Patent Application No. JP 2005-316220 filed on Oct. 31, 2005, the disclosure of which is hereby incorporated by reference herein.

BACKGROUND OF THE INVENTION

1. Field of the Invention

The present invention relates to a transmission/reception system, recording apparatus and method, a providing apparatus and method, and a computer program and, more particularly, to a transmission/reception system, recording apparatus and method, a providing apparatus and method, and a computer program that are configured to enhance the degree of freedom in the use of content while minimizing the chance of easy duplication of content.

2. Description of the Related Art

The copyright information associated with current digital broadcast programs (or content) is defined by a digital copy control descriptor inserted in a PMT (Program Map Table) of PSI (Program Specific Information) that is multiplexed with each transport stream.

Namely, the digital copy control descriptor is used for each content right holder to send the information associated with content copy to a receiving device. The copyright information to be defined by digital copy control descriptor includes "copy free" (copy enabled without restriction), "copy never" (copy disabled) and "copy once" (copy enabled only once).

For example, with a hybrid-type recording apparatus incorporating a HDD (Hard Disk Drive) and a DVD (Digital Versatile Disc) drive, if "copy once" content is recorded to the HDD, it is regarded at that moment that the content has been copied in "copy once" mode and the CCI (Copy Control Information) of that content is set to copy disabled status. The CCI is the information associated with the restriction of copy of each piece of content in the recording apparatus.

Therefore, the user subsequently can view the content reproduced from the HDD but cannot copy the content to a DVD to view on an external player, for example. The current digital broadcasting prevents content from being copied as described above.

The recording capacity of the HDD is necessarily limited. If a HDD is fully recorded with content, an excess piece of content may be copied to another recording media such as a removable media to delete the copied content from the HDD, thereby creating a free space for recording on the HDD. However, some pieces of content cannot be copied because of any of the above-mentioned copy restrictions.

To circumvent the above-mentioned problem, a technique called "move" may be used.

The move technique is used to copy "copy once" content for example recorded to a HDD to a recording media such as DVD and a Blue-ray Disk (trademark) for example and, the copied part of the content on the HDD is realtime deleted or invalidated; when the copying has all been completed, the copied content on the HDD is all deleted or invalidated, thereby making the copied content unavailable on the HDD while leaving one piece of copied content available on the copy destination recording media (refer to Japanese Patent Laid-open No. 2003-16725).

This technique allows the user to copy even "copy once" content from a HDD to another recording media, thereby allowing the recording media copied with the content (or the recording media to which the content has been moved) to be loaded onto another player for use of the content on other than the HDD.

However, in spite of the recent availability of various types of recording media, "copy once" content can be moved only to one recording media, thereby significantly lowering user convenience in the handling of content.

If the copy enabled count is simply increased to enhance the user convenience, the easy copying by the user may be incurred, thereby putting content right holders at a disadvantage.

Therefore, the present invention addresses the above-identified and other problems associated with related-art methods and apparatuses and solves the addressed problems by significantly enhancing the degree of freedom in the use of content by the user while preventing the easy copying of content by the user.

SUMMARY OF THE INVENTION

In carrying out the invention and according to a first embodiment thereof, there is provided a transmission/reception system having a providing apparatus and a recording apparatus. The providing apparatus includes a generating section configured to generate, as attribute information associated with each piece of content to be broadcast, restrictive information including a first attribute for specifying a copyable count and a second attribute for specifying a restriction to be added every time copying is executed. The providing apparatus further has a providing section configured to provide the restrictive information with each piece of the content by broadcasting to the recording apparatus that records each piece of the content to an internal recording media and copies the recorded content. The recording apparatus includes a management section configured to manage the restrictive information recorded to the internal recording media. The recording apparatus further includes a restriction section configured to add, every time each piece of the content recorded to the internal recording media is copied within a range of the copyable count specified by the first attribute, the restriction specified by the second attribute to at least one of a next copying of substantially the same content as copied last or each piece of the content recorded to the internal recording media that provided a source of the copying.

In carrying out the invention and according to a second embodiment thereof, there is provided a recording apparatus for recording content to be broadcast to an internal recording media and copying the recorded content. The recording apparatus includes a management section configured to manage restrictive information to be obtained as attribute information associated with content recorded to the internal recording media, the restrictive information including a first attribute for specifying a copyable count and a second attribute for specifying a restriction to be added every time copying is executed. The recording apparatus further includes a restriction section configured to add, every time the content recorded to the internal recording media is copied within a range of the copyable count specified by the first attribute, a restriction specified by the second attribute to at least one of a next copying of substantially the same content as copied last or the content recorded to the internal recording media that provided a source of the copying.

In the above-mentioned recording apparatus, the restriction section sets an interval until a next copy is enabled to add a restriction to the next copy of substantially the same content as copied last.

In the above-mentioned recording apparatus, the restriction section adds a restriction to a next copy of substantially the same content as copied last by lowering an image quality of the next copy.

In the above-mentioned recording apparatus, the restriction section adds a restriction to the content recorded to the internal recording media that provided a source of the copying by setting a time interval in which the content can be recorded.

In carrying out the invention and according to the second embodiment thereof, there is provided a recording method or a program that includes managing restrictive information to be obtained as attribute information associated with content recorded to an internal recording media, the restrictive information including a first attribute for specifying a copyable count and a second attribute for specifying a restriction to be added every time copying is executed. The recording method or the program further includes adding, every time the content recorded to the internal recording media is copied within a range of the copyable count specified by the first attribute, a restriction specified by the second attribute to at least one of a next copying of substantially the same content as copied last or the content recorded to the internal recording media that provided a source of the copying.

In carrying out the invention and according to a third embodiment thereof, there is provided a providing apparatus. The providing apparatus includes a generating section configured to generate, as attribute information associated with each piece of content to be broadcast, restrictive information including a first attribute for specifying a copyable count and a second attribute for specifying a restriction to be added every time copying is executed. The providing apparatus further includes a providing section configured to provide the restrictive information with each piece of the content by broadcasting to a recording apparatus that records each piece of the content to be broadcast to an internal recording media and copies the recorded content.

In carrying out the invention and according to the third embodiment thereof, there is provided a providing method or a program that includes generating, as attribute information associated with each piece of content to be broadcast, restrictive information including a first attribute for specifying a copyable count and a second attribute for specifying a restriction to be added every time copying is executed. The providing method or the program further includes providing the restrictive information generated with each piece of the content by broadcasting to a recording apparatus that records each piece of the content to be broadcast to an internal recording media and copies the recorded content.

In the first embodiment of the invention, restrictive information is generated as attribute information associated with each piece of content to be broadcast. This attribute information includes a first attribute for specifying a copyable count, and a second attribute for specifying restrictions to be added every time a copy is made. The content to be broadcast is recorded to an internal recording media. The generated restrictive information is broadcast along with the content to the recording apparatus that copies the recorded content. Also, restrictive information to be obtained as the attribute information associated with each piece of the content recorded to the internal recording media, including the first attribute for specifying a copyable count and the second attribute for specifying restrictions to be added every time copy is made, is managed. Every time the content recorded to the internal recording media is copied in a range of the copyable count specified by the first attribute, the restrictions specified by the second attribute are added to at least one of the next copy of the same content as copied last or the content recorded to the internal recording media that was the source of the copy.

In the second embodiment of the invention, restrictive information to be obtained as the attribute information associated with each piece of content recorded to the internal recording media, including a first attribute for specifying a copyable count and a second attribute for specifying restrictions to be added every time a copy is made, is managed. Every time the content recorded to the internal recording media is copied in a range of the copyable count specified by the first attribute, the restrictions specified by the second attribute are added to at least one of the next copy of the same content as copied last or the content recorded to the internal recording media that was the source of the copy.

In the third embodiment of the invention, restrictive information including a first attribute for specifying a copyable count and a second attribute for specifying restrictions to be added every time a copy is made is generated as the attribute information associated with each piece of content to be broadcast. The content to be broadcast is recorded to the internal recording media. The generated restrictive information is broadcast to the recording apparatus that records the content to be broadcast to the internal recording media and copies the recorded content.

According to the invention, the degree of freedom in the use of content by users is significantly enhanced, while preventing users from copying the content as desired.

BRIEF DESCRIPTION OF THE DRAWINGS

FIG. 2 is a block diagram illustrating an exemplary functional configuration of the recording apparatus shown in FIG. 1;

FIG. 3 is a diagram indicative of example attributes of restrictive information;

FIG. 4 is a diagram indicative of an example of attribute values and restrictive contents;

FIG. 5 is another diagram indicative of an example of attribute values and restrictive contents;

FIG. 10 is a block diagram illustrating an exemplary configuration of a personal computer.

DETAILED DESCRIPTION

This invention will be described in further detail by way of example with reference to the accompanying drawings. The invention described herein and the embodiments thereof have the following correlation. The description hereof is intended to make sure of the fact that the embodiments supporting the invention described herein are described herein. Therefore, if there is any embodiment that, although described in the description of the preferred embodiment or in the figures, is not described herein as corresponding to the invention, this does not denote in any manner that such an embodiment does not corresponding to the present invention. Conversely, if any embodiment is described herein as corresponding to the invention, it does not denote in any manner that such an embodiment does not corresponding to other inventions than the present invention.

Figure 1:
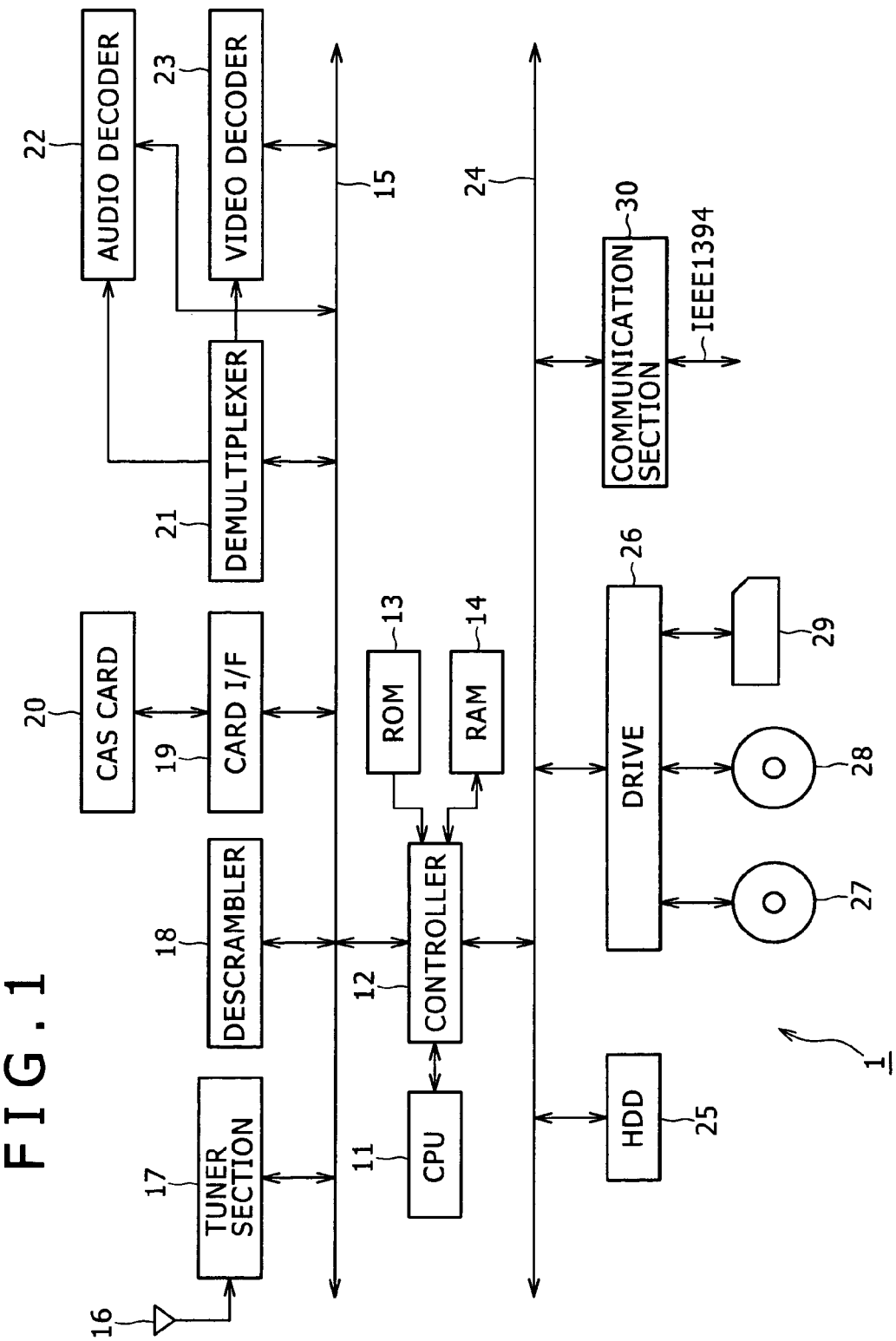
FIG. 1 is a block diagram illustrating an exemplary configuration of a recording apparatus practiced as one embodiment of the invention.

A transmission/reception system (for example, a transmission/reception system shown in FIG. 7) according to the first embodiment of the present invention has a providing apparatus (for example, a providing apparatus 52 shown in FIG. 7) and a recording apparatus (for example, a recording apparatus 1 shown in FIG. 1). The providing apparatus has generating means (for example, a restrictive information generating section 81 shown in FIG. 9) configured to generate, as attribute information associated with each piece of content to be broadcast, restrictive information including a first attribute for specifying a copyable count and a second attribute for specifying a restriction to be added every time the copying is executed. The providing apparatus further has providing means (for example, a providing section 82 shown in FIG. 9) configured to provide, by broadcasting, the restrictive information generated by the generating means with the each piece of content to the recording apparatus that records the each piece of content to be broadcast to an internal recording media and copies the recorded content. The recording apparatus has management means (for example, a restrictive information management section 42 shown in FIG. 2) configured to manage the restrictive information to be obtained as attribute information associated with the each piece of content recorded to the internal recording media, the restrictive information including the first attribute for specifying a copyable count and the second attribute for specifying a restriction to be added every time the copying is executed. The recording apparatus further has restriction means (for example, copy control section 44 shown in FIG. 2) configured to add, every time the each piece of content recorded to the internal recording media is copied within a range of a copyable count specified by the first attribute, a restriction specified by the second attribute to at least one of a next copying of substantially the same content as copied last and the each piece of content recorded to the internal recording media that provided a source of the copying.

The recording apparatus (for example, a recording apparatus 1 shown in FIG. 1) according to the second embodiment of the present invention has management means (for example, a restrictive information management section 42 shown in FIG. 2) configured to manage the restrictive information to be obtained as attribute information associated with the content recorded to the internal recording media, the restrictive information including a first attribute for specifying a copyable count and a second attribute for specifying a restriction to be added every time the copying is executed. The recording apparatus further has restriction means (for example, a copy control section 44 shown in FIG. 2) configured to add, every time the content recorded to the internal recording media is copied within a range of a copyable count specified by the first attribute, a restriction specified by the second attribute to at least one of a next copying of substantially the same content as copied last and the content recorded to the internal recording media that provided a source of the copying.

A recording method or a program according to the second embodiment of the present invention has a step (for example, step S7 shown in FIG. 6) of managing the restrictive information to be obtained as attribute information associated with the content recorded to the internal recording media, the restrictive information including a first attribute for specifying a copyable count and a second attribute for specifying a restriction to be added every time the copying is executed. Further, in the step, every time the content recorded to the internal recording media is copied within a range of a copyable count specified by the first attribute, a restriction specified by the second attribute is added to at least one of a next copying of substantially the same content as copied last and the content recorded to the internal recording media that provided a source of the copying.

Figure 9:
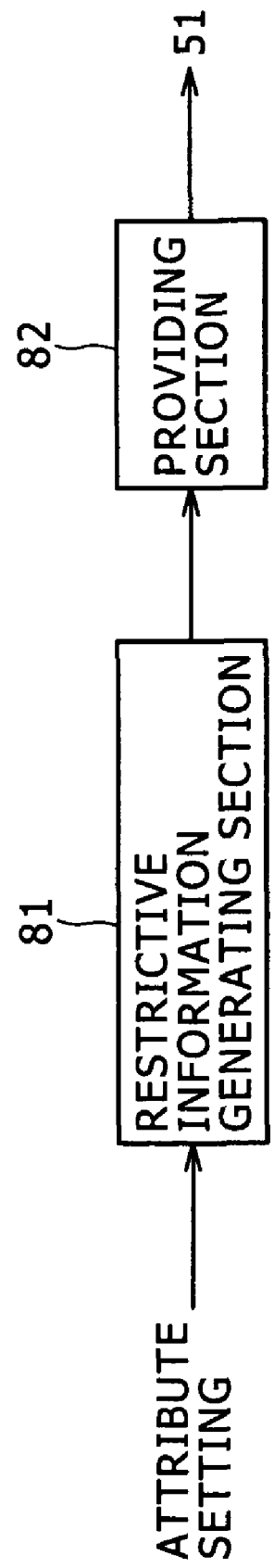
FIG. 9 is a flowchart indicative of processing of the above-mentioned providing apparatus.

A providing apparatus (for example, a providing apparatus 52 shown in FIG. 7) according to the third embodiment of the present invention has generating means (for example, a restrictive information generating section 81 shown in FIG. 9) configured to generate, as attribute information associated with each piece of content to be broadcast, restrictive information including a first attribute for specifying a copyable count and a second attribute for specifying a restriction to be added every time the copying is executed. The providing apparatus further has providing means (for example, a providing section 82 shown in FIG. 9) configured to provide, by broadcasting, the restrictive information generated by the generating means with the each piece of content to the recording apparatus that records the each piece of content to be broadcast to an internal recording media and copies the recorded content.

A providing method or a program according to the third embodiment of the present invention has a step (for example, step S12 shown in FIG. 10) of generating, as attribute information associated with each piece of content to be broadcast, restrictive information including a first attribute for specifying a copyable count and a second attribute for specifying a restriction to be added every time the copying is executed. Further in the step, by broadcasting, the generated restrictive information with the each piece of content are provided to the recording apparatus that records the each piece of content to be broadcast to an internal recording media and copies the recorded content.

The following describes embodiments of the invention with reference to accompanying drawings.

Now, referring to FIG. 1, there is shown an exemplary configuration of the recording apparatus 1 practiced as one embodiment of the present invention.

A CPU (Central Processing Unit) 11 executes, through a controller 12, programs stored in a ROM (Read Only Memory) 13 or loaded from a HDD (Hard Disk Drive) 25 to a RAM (Random Access Memory) 14, thereby controlling component sections connected to a bus 15 and a bus 24.

For example, in accordance with copy restrictions (or copy restrictions to be defined by a digital copy control descriptor inserted in the PSI) to be defined by the SPI multiplexed with each transport stream, the CPU 11 copies (or duplicates) content recorded to the HDD 25. As will be described later, copy may be made by the predetermined number of times. Every time copy is made within a range of that copy enabled count, the CPU 11 add restrictions to copying of the same content as copied last or to the original content stored in the copy-source HDD 25.

A tuner section 17 receives a broadcast signal at an antenna 16, demodulates the received broadcast signal, and outputs a transport stream to be broadcast in a predetermined channel to a descrambler 18 via the bus 15 under the control of the CPU 11.

The descrambler 18 generates a key for descramble the scrambled transport stream by use of data stored in a CAS card 20 loaded in a card I/F (Interface) 19, thereby descrambling the transport stream supplied from the tuner section 17. The transport stream descrambled by the descrambler 18 is supplied to a demultiplexer 21 via the bus 15, for example.

The card I/F 19 supplies the data read from the CAS card 20 to the descrambler 18 via the bus 15.

Under the control of the CPU 11, the demultiplexer 21 extracts a predetermined stream from the transport stream received from the descrambler 18 and outputs packets forming the extracted stream over the bus 15 or to an audio decoder 22 and a video decoder 23. The content made up of the packets obtained by the demultiplexer 21 is supplied to the HDD 25 via the bus 15, the controller 12, and the bus 24 for example to be recorded to the HDD 25.

Also, the demultiplexer 21 outputs content attribute information extracted from the transport stream, such as PSI/SI (Program Specific Information/Service Information) for example, to the CPU 11 via the bus 15 and the controller 12.

The audio decoder 22 decodes the audio data (or audio packets) supplied from the demultiplexer 21 and outputs the decoded audio data from an audio output terminal, not shown. The audio data outputted from the audio output terminal is received by a television receiver for example connected to the recording apparatus 1 to be sounded from a loudspeaker of the television receiver.

The video decoder 23 decodes the video data (or video packets) supplied from the demultiplexer 21 and outputs the obtained video data from a video output terminal, not shown. The video data outputted from the video output terminal is received by the television receiver connected to the recording apparatus 1 to be displayed on the display monitor of the television receiver.

The HDD 25 stores the content supplied via the bus 24. The content recorded to the HDD 25 is read from time to time under the control of the CPU 11 to be reproduced, copied, or moved, for example.

A drive 26 drives such an optical disk loaded thereon such as a DVD (Digital Versatile Disc) 27 or a Blue-ray Disk (trademark) 28 (hereafter referred to as a BD 28) or a memory card 29 loaded on a slot formed in the case of the recording apparatus 1 to record data to one of these loaded recording media via the bus 24 or reads data from one of these recording media to output the data over the bus 24. For example, if the copying of the content from the HDD 25 to the DVD 27 is specified, the drive 26 records the content supplied from the HDD 25 via the bus 24 to the DVD 27.

A communication section 30 executes communication with an external device connected to the recording apparatus 1 via an IEEE (Institute of Electrical and Electronics Engineers) 1394 cable, thereby outputting the contents supplied over the bus 24, for example, to that external device.

Referring to FIG. 2, there is shown a block diagram illustrating an exemplary functional configuration of the recording apparatus 1. At least a part of the configuration shown in FIG. 2 is realized by the execution of a predetermined program by the CPU 11 shown in FIG. 1.

As shown in FIG. 2, an analyzing section 41, a restrictive information management section 42, a timer 43, a copy control section 44, and an internal content management section 45 are realized in the recording apparatus 1.

The analyzing section 41 analyzes the PSI extracted by the demultiplexer 21 to output the restrictive information indicative of the defined copy restriction to the restrictive information management section 42. As will be described later, the restrictive information includes various kinds of attributes and defines each piece of content recorded to the HDD 25 other than the definitions "copy free (copyable without restriction)," "copy never (copy disabled)," and "copy once (copyable only by one generation)." In the recording apparatus 1, the content recorded to the HDD 25 is copyable within a restrictive range defined by the restrictive information.

The restrictive information management section 42 manages the restrictive information supplied from the analyzing section 41. When the copying of the content recorded to the HDD 25 is specified by the user, the restrictive information management section 42 references the restrictive information managed thereby to control the copy control section 44 to execute the copying within a restrictive range defined by the restrictive information and, at the same time, by use of this copying as a trigger, add restrictions to the next copying of the same content as copied last or the original content as copy source stored in the HDD 25. The contents of these restrictions are also defined in the restrictive information managed by the restrictive information management section 42.

Time information indicative of a current time is supplied from the timer 43 to the restrictive information management section 42. The restrictive information management section 42 references the supplied time information adds various restrictions, for example.

The timer 43 outputs the time information indicative of a current time to the restrictive information management section 42.

The copy control section 44 reads the content from the HDD 25 under the control of the restrictive information management section 42 and copies the content to a recording media loaded on the drive 26. At this moment, the copy control section 44 lowers the image quality of the content, or lowering the resolution or the bit rate of the content, for example, before copying the content.

The internal content management section 45 manages the content (or the internal content) stored in the HDD 25 under the control of the restrictive information management section 42. The restrictive information management section 42 gives a command to the internal content management section 45 for deleting the content from the HDD 25 upon passing of a predetermined time after the recording of the content to the HDD 25, for example.

The following describes restrictions to be defined by the restrictive information.

Referring to FIG. 3, there is shown a diagram indicative of exemplary attributes represented by the restrictive information. The values of these attributes and the specific examples of the restrictive contents will be described later.

In the example shown in FIG. 3, attribute 1 is indicative of copyable count (or the number of times copy can be made), attribute 2 is indicative of copy disabled time (A and B), attribute 3 is indicative of image quality of copy (A and B), attribute 4 is indicative of holding time in HDD (or a time in which content can be held in HDD) (A and B), and attribute 5 is indicative of copy count decrement (or the number of times copy is decremented).

The copyable count attribute defines the number of times content recorded to the HDD 25 can be copied. Within the restrictive range defined by this attribute, the content stored in the HDD 25 can be copied to any of the DVD 27, the BD 28, and the memory card 29, for example.

Copy disabled time attribute A defines a period of time in which the content stored in the HDD 25 as copied last becomes copyable next, namely, restrictions associated with a time in which the same content is disabled for copying. Copy disabled time attribute B specifies the copy disabled time.

Copy image quality attribute A defines the image quality of the same content to be copied next as copied last. Copy image quality attribute B specifies the degree of the image quality of the content to be copied.

Holding-time-in-HDD attribute A defines restrictions associated with a period of time, relative to the time at which the content is copied from the HDD 25, in which the original content that is the source of copy can be kept recorded to the HDD 25. Holding-time-in-HDD attribute B specifies this period of time. When the specified period of time has passed, the original content that is the source of copy is deleted from the HDD 25.

The copy count decrement attribute defines, after the specified period of time has passed, restrictions associated with the decrement of the number of times copy can be made of the content recorded to the HDD 25 from the number of times the content can be copied defined in the copyable count.

As described above, the attributes included in the restrictive information are largely classified into those which define the restrictions associated with the copying of the same content as copied last (copyable attribute, copy disabled time attribute, copy image quality attribute, and copy count decrement attribute) and one that defines the restrictions associated with the original content in the HDD 25 that is the source of copy (Holding-time-in-HDD attribute).

The following describes the values of the above-mentioned attributes and the specific examples of the above-mentioned restrictions shown in FIG. 3 with reference to FIGS. 4 and 5.

FIG. 4 shows specific examples of the copyable count attribute (attribute 1), copy disabled time attributes A and B (attributes 2A and 2B), and the copy image quality attributes A and B (attributes 3A and 3B). By the same token, FIG. 5 shows the holding-time-in-HDD attributes A and B (attributes 4A and 4B) and the copy count decrement attribute.

As shown in FIG. 4, if the value of the copyable count attribute (attribute 1) is 1, it indicates the content recorded to the HDD 25 can be copied only once; if this value is 2, the content can be copied only twice.

Likewise, if the value of the copyable count attribute is 3 or more, the contents recorded to the HDD 25 can be copied by the specified number.

"Copy once (copyable only by one generation)" content, once recorded to the HDD 25, cannot be copied again to another recording media. With the recording apparatus 1, however, the "copy once" content recorded to the HDD 25 can be copied again within a range defined by the copyable count attribute as described above.

Consequently, the user can copy the content from the HDD 25 to the BD 28, for example, to reproduce the copied content by a player compliant with Blu-ray disk or copy the content from HDD 25 to the memory card 29 to reproduce the copied content by a portable player on which the memory card 29 is loaded, thereby handling content in a manner high in the degree of freedom.

Returning to FIG. 4, if the value of copy disabled time attribute A (attribute 2A) is 0, it indicates that, if the content recorded to the HDD 25 is copied, there is no restriction on a period of time in which the same content becomes copyable; if the value is 1, it indicates that, if the content recorded to the HDD 25 is copied once, then the copying of the same content is disabled by a period of time specified by copy disabled time attribute B.

If the value of copy disabled time attribute A is 2, it indicates that, if the content recorded to the HDD 25 is copied twice, the copying of the same content is disabled by a period of time specified by copy disabled time attribute B.

Likewise, if the value of copy disabled time attribute A is 3 or more, it indicates that, if the content recorded to the HDD 25 has been copied by a count corresponding to the value specified by copy disabled time attribute A, then the copying of the same content is disabled by a period of time specified by copy disabled time attribute B.

In the example shown in FIG. 4, values 0, 1, 2 and 3 of copy disabled time attribute B (attribute 2B) respectively indicates that: there is no restriction of time, one hour, one day, and one week.

For example, the value of copy disabled time attribute A is 2 and the value of copy disabled time attribute B is 1, then the user can copy the content recorded to the HDD 25 once or twice without any restriction; however, with the third or further copying, the user can copy the same content only once in one hour.

Consequently, the user is allowed to copy content, while the content right holder can prevent the user from copying content as desired.

As shown in FIG. 4, if the value of copy image quality attribute A (attribute 3A) is 0, it indicates that, if the content recorded to the HDD 25 is copied, the next copying of the same content does not involve any restriction to the image quality; if the value 1, it indicates that, if the content recorded to the HDD 25 is copied once, then the image quality of the subsequent copying of the same content is restricted by that copy image quality attribute B specifies.

If the value of copy image quality attribute A is 2, it indicates that, if the content recorded to the HDD 25 has been copied twice, the image quality of the subsequent copying of the same content is restricted by that copy image quality attribute B specifies.

Likewise, if the value of copy image quality attribute A is 3 or more, it indicates that, if the content recorded to the HDD 25 has been copied by a count corresponding to the value specified by copy image quality attribute A, then the image quality of the subsequent copying of the same content is restricted by that copy image quality attribute B specifies.

In the example shown in FIG. 4, value 0 of copy image quality attribute B (attribute 3B) indicates that there is no restriction to the image quality (the copying can be made with the same image quality as that of the original content) and value 1 indicates that the image quality is lowered by lowering the bit rate of the copying relative to that of the original content.

Value 2 of copy image quality attribute B indicates that the image quality of the copying is lowered by lowering the resolution of the copying to less than 640×480 relative to the resolution of the original content.

For example, if the value of copy image quality attribute A is 2 and the value of copy image quality attribute B is 1, then the user can copy the content recorded to the HDD 25 one or twice without any restriction; however, with the third and subsequent copying of the same content, the user can copy the content only with a bit rate lower than that of the original content, or a lower image quality than that of the original content.

Consequently, the user can copy content, while the content right holder can prevent the user from copying content with desired image qualities.

In the example shown in FIG. 5, value 0 of holding-time-in-HDD attribute A (attribute 4A) indicates that, if the content recorded to the HDD 25 is copied, there is no restriction to a period of time in which the original content is kept recorded to the HDD 25, namely, kept recorded until the intentional specification by the user. If the value is 1, it indicates that, the content recorded to the HDD 25 is copied once, the original content can be kept recorded to the HDD 25 only by a period of time specified by holding-time-in-HDD attribute B relative to that copying.

If the value of holding-time-in-HDD attribute A is 2, it indicates that, if the content recorded to the HDD 25 has been copied twice, the original content can be kept recorded to the HDD 25 only by a period of time specified by holding-time-in-HDD attribute B relative to the second copying.

Likewise, if the value of holding-time-in-HDD attribute A is 3 or more, it indicates that, if the content recorded to the HDD 25 has been copied by a count corresponding to a value of holding-time-in-HDD attribute A, the original content can be kept recorded to the HDD 25 only by a period of time specified by holding-time-in-HDD attribute B relative to that copying.

In the example shown in FIG. 5, value 0 of holding-time-in-HDD attribute B indicates no restriction to the holding time and value 1 indicates one month. Value 2 of holding-time-in-HDD attribute B indicates one week and value 3 indicates one day.

For example, if the value of holding-time-in-HDD attribute A is 2 and the value of holding-time-in-HDD attribute B is 1, it indicates that, if the content recorded to the HDD 25 has been copied twice, the original content can be kept recorded to the HDD 25 only by one month relative to the second copying.

Consequently, the user can copy content, while the content right holder can prevent the user from keeping content recorded as desired.

In the example shown in FIG. 5, if the value of copy count decrement attribute (attribute 5) is 0, it indicates that, if time passes after the recording of content to the HDD 25, there is no restriction to the decrement of the copyable count of the content which defined by copyable count attribute, namely, the content can be copied by a count specified by copyable count attribute. If the value is 1, it indicates that, every time one month passes after the recording of the content to the HDD 25, the copyable count specified by copyable count attribute is decremented by 1.

If the value of copy count decrement attribute is 2, it indicates that every time one week passes after the recording of the content to the HDD 25, the copyable count specified by copyable count attribute is decremented by 1. If the value is 3, it indicates that every time one day passes after the recording of the content to the HDD 25, the copyable count specified by copyable count attribute is decremented by 1.

Instead of decrementing the copyable count every time a predetermined period passes, it may also be configured that the copyable count is decremented by only 1 every time a predetermined period, such as one month or one week, has passed after the recording of content to the HDD 25.

The above-mentioned various attributes are used in combinations for particular pieces of content.

For example, if the value of copyable count attribute is 5 (copying is enabled up to five times), the value of copy disabled time attribute A is 2, and the value of copy disabled time attribute B is 1, then the content with such copy restrictions set can be copied up to five times in all; the user can copy twice without any restriction, but the user cannot copy if one hour or more is put between the second and third copy operations, the third and fourth copy operations, and the fourth and fifth copy operations.

The restrictive information management section 42 shown in FIG. 2 executes the copy count management and, at the same time, the management of time intervals on the basis of time information supplied from the timer 43.

For example, if the value of copyable count attribute is 3 (copying is enabled up to three times), the value of copy image quality attribute A is 2, and the value of copy image quality attribute B is 2, then the content with such copy restrictions set can be copied up to three times in all; the user can copy twice without any restriction, but the user can execute the third copy only with an image quality lower than that of the original content, namely a resolution lower than a predetermined level (640×480).

The restrictive information management section 42 shown in FIG. 2 executes the copy count management and, at the same time, controls the copy control section 44 such that content is copied with the resolution converted.

For example, if the value of copyable count attribute is 3 (copying is enabled up to three times), the value of holding-time-in-HDD attribute A is 1, and the value of holding-time-in-HDD attribute B is 1, then the content with such restrictions set can be copied up to 3 times in all; but, after the first copying, the user can keep the original content recorded to the HDD 25 for only one month.

The restrictive information management section 42 shown in FIG. 2 executes the copy count management and, at the same time, the management of the period of time in which the original content can be kept recorded to the HDD 25 on the basis of the time information supplied from the timer 43.

If the value of copyable count attribute is 4 (copying is enabled up to four times) and the value of copy count decrement attribute is 2, then the content with such restrictions set can be copied up to four times in all until one week passes after the recording to the HDD 25; but, every time one week subsequently passes, copying is enabled only by a count obtained by decrementing the remaining copy count by 1.

The restrictive information management section 42 shown in FIG. 2 executes copy count management and, at the same time, the management of the time subsequent to the recording to the HDD 25 on the basis of the time information supplied from the timer 43.

It should be noted that, in the above-mentioned examples, a combination of copyable count attribute and copy disabled time attribute, a combination of copyable count attribute and copy image quality attribute, a combination of copyable count attribute and holding-time-in-HDD attribute, and a combination of copyable count attribute and copy count decrement attribute are used; it is also practicable to use combinations of three or more attributes.

Figure 6:
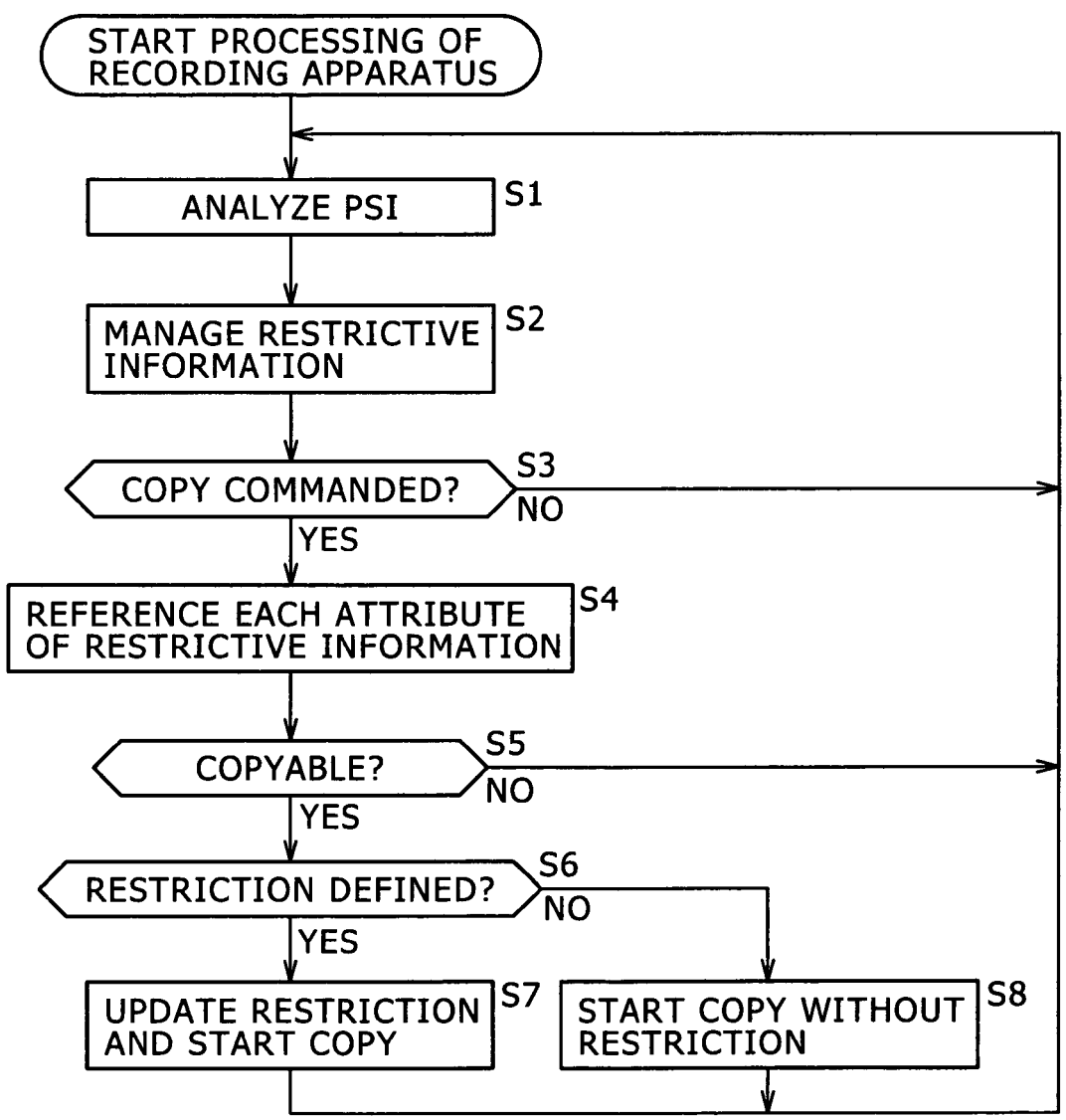
FIG. 6 is a flowchart indicative of processing of the above-mentioned recording apparatus.

The following describes the processing of the recording apparatus 1 for managing the copying of the content recorded to the HDD 25 with reference to the flowchart shown in FIG. 6.

In step S1, the analyzing section 41 analyzes the PSI extracted by the demultiplexer 21 to output the restrictive information about the content recorded to the HDD 25 to the restrictive information management section 42.

In step S2, the restrictive information management section 42 manages the control information supplied from the analyzing section 41. In step S3, the restrictive information management section 42 determines whether or not the copying of the content recorded to the HDD 25 has been commanded by the user. The command by the user is entered by use of a remote controller, for example.

If the copying is found by the restrictive information management section 42 not command in step S3, then the procedure returns to step S1 to repeat the above-mentioned processing therefrom. If the copying is found commanded, then the procedure goes to step S4.

In step S4, the restrictive information management section 42 references the attributes included in the restrictive information of the content commanded for copying, of the restrictive information managed by the restrictive information management section 42. In step S5, the restrictive information management section 42 determines whether or not the content is copyable.

For example, if the remaining copyable count is 0 or it is necessary to provide an interval before the next copying, the restrictive information management section 42 determines in step S5 that the content is copyable no more, upon which the procedure returns to step S1 to repeat the above-mentioned processing therefrom. At this time, a message that the content cannot be copied is displayed along with a reason thereof onto the television receiver for example connected to the recording apparatus 1.

If the remaining copyable count is found in step S5 to be one or more or an interval to be provided before the next copying is found passed, the restrictive information management section 42 determines in step S5 that the content can still be copied, upon which the procedure goes to step S6.

In step S6, the restrictive information management section 42 determines whether copy restrictions or restrictions to the original content in the HDD 25 have been defined or not.

If copy restrictions or restrictions to the original content in the HDD 25 are found defined in step S6, the procedure goes to step S7, in which the restrictive information management section 42 updates the restrictions to make the copy control section 44 execute copying to repeat the above-mentioned processing from step S1.

For example, if an interval must be provided before the next copying because the content has been copied by more than a predetermined copyable count, the restrictive information management section 42 makes the copy control section 44 execute copying and starts managing the time until the same content becomes copyable. If the image quality must be lowered because the content has been copied by more than a predetermined copyable count, the restrictive information management section 42 controls the copy control section 44 to copy the content with a lowered image quality. If it is necessary to start managing the period of time in which the original content can be kept recorded to the HDD 25 because the content has been copied by more than a predetermined copyable count, the restrictive information management section 42 controls the copy control section 44 to execute copying and, at the same time, starts managing the period of time.

On the other hand, if the restrictive information management section 42 determines in step S6 that no copy restrictions or no restrictions to the original content in the HDD 25 are found defined, then the procedure goes to step S8, in which the restrictive information management section 42 controls the copy control section 44 to execute copying without restrictions, repeating the above-mentioned processing from step S1.

The above-mentioned processing realizes the enhanced degree of freedom in the use of content by the user, while preventing the user from copying the content as desired.

The following describes a configuration of the broadcast side (or the transmission side) that generates the restrictive information for use in the management of content as described above and inserts the generated restrictive information into the PSI to be broadcast with content.

Figure 7:
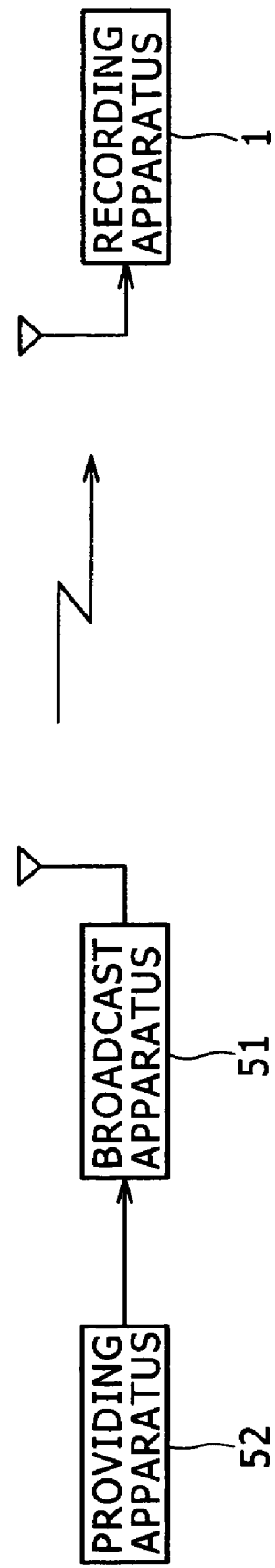
FIG. 7 is a schematic diagram illustrating an exemplary configuration of a transmission/reception system.

Referring to FIG. 7, there is shown an exemplary configuration of a transmission/reception system made up of the recording apparatus 1 providing a reception side configuration, and a transmission side configuration.

As shown in FIG. 7, the transmission side configuration is made up of a broadcast apparatus 51 and a providing apparatus 52.

The broadcast apparatus 51 encodes and multiplexes content and attribute information, such as PSI/SI, and broadcasts the resultant content and attribute information to the receiving side apparatus. The PSI to be broadcast by the broadcast apparatus 51 includes the restrictive information (the information including attributes shown in FIG. 3) generated by the providing apparatus 52.

The providing apparatus 52 generates restrictive information as the attribute information of each piece of content in accordance with the settings made by the content right holder for example and outputs the generated restrictive information to the broadcast apparatus 51. The restrictive information generated by the providing apparatus 52 is broadcast with the content to be provided to the recording apparatus 1.

Figure 8:
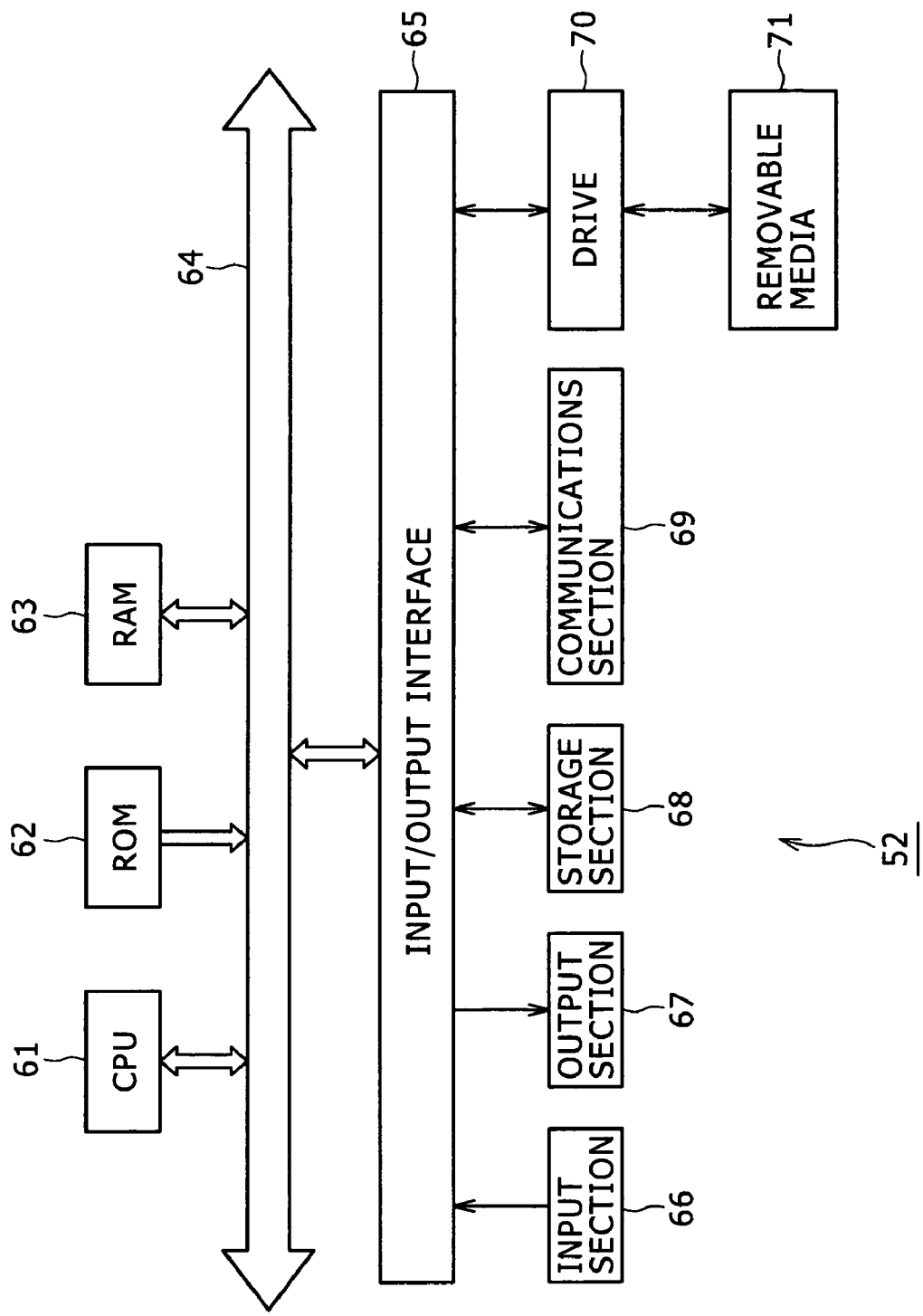
FIG. 8 is a block diagram illustrating an exemplary configuration of a providing apparatus shown in FIG. 7.

Referring to FIG. 8, there is shown a block diagram illustrating an exemplary configuration of the providing apparatus 52 shown in FIG. 7.

A CPU 61 executes various processing operations as instructed by programs stored in a ROM 62 or a storage section 68. A RAM 63 appropriately stores programs to be executed by the CPU 61 and data necessary for the execution. The CPU 61, the ROM 62, and the RAM 63 are interconnected with a bus 64.

The CPU 61 is also connected with an input/output interface 65 via the bus 64. The input/output interface 65 is connected with an input section 66 based on a keyboard, a mouse, and a microphone, for example, and an output section 67 based on a display monitor and a loudspeaker, for example. The CPU 61 sets attribute values in accordance with data entered through the input section 66, thereby generating restrictive information.

The storage section 68 connected to the input/output interface 65, based on a hard disk drive for example, stores programs to be executed by the CPU 61 and data necessary for the execution. A communication block 69 executes communication with external devices via a network, such as the Internet and a local area network. The communication block 69 also outputs the generated restrictive information to the broadcast apparatus 51.

A drive 70 connected to the input/output interface 65 drives a removable media 71, such as a magnetic disk, an optical disk, a magneto-optical disk, or a semiconductor memory, for example, when the removable media 71 is loaded on the drive 70, thereby obtaining programs and data from the removable media 71. The obtained programs and data are transferred to the storage section 68 to be stored as required.

Referring to FIG. 9, there is shown a block diagram illustrating an exemplary functional configuration of the providing apparatus 52. At least a part of the configuration shown in FIG. 9 is realized by the execution of a predetermined program by the CPU 61 shown in FIG. 8.

As shown in FIG. 9, a restrictive information generating section 81 and a providing section 82 are realized in the providing apparatus 52.

A restrictive information generating section 81 receives attribute settings through the input section 66 and sets the received attribute settings to generate the restrictive information for defining predetermined restrictions. The restrictive information generated by the restrictive information generating section 81 is outputted to the providing apparatus 82.

The providing section 82 outputs the restrictive information received from the restrictive information generating section 81 to the broadcast apparatus 51 that broadcasts the restrictive information with the content, thereby providing the restrictive information to the recording apparatus 1.

The following describes the processing of the providing apparatus 52 having the above-mentioned configuration with reference to the flowchart shown in FIG. 10.

In step S1, the restrictive information generating section 81 receives attribute settings entered through the input section 66 and sets the received attribute settings to generate the restrictive information for defining predetermined restrictions, outputting the generated restrictive information to the providing section 82.

In step S12, the providing section 82 outputs the restrictive information received from the restrictive information generating section 81 to the broadcast apparatus 51 that broadcasts the received restrictive information along with the content, thereby providing the restrictive information to the recording apparatus 1.

The restrictive information generated by the above-mentioned processing is received and obtained by the recording apparatus 1. By use of the copying as a trigger as described before, the recording apparatus 1 adds restrictions to subsequent copying and restrictions to the original content recorded to the HDD 25 in accordance with the definition based on the obtained restrictive information.

It should be noted that, with reference to FIG. 7, the providing apparatus 52 for generating restrictive information is arranged separately from the broadcast apparatus 51; it is also practicable to provide configurations shown in FIGS. 8 and 9 in the broadcast apparatus 51.

In the above-mentioned configurations, the copying of content is used as a trigger for adding either restrictions to the subsequent copying of the same content or resections to the original content recorded to the HDD 25; it is also practicable to add both restrictions.

The above-mentioned sequence of processing operations may be executed by software as well as hardware. When the above-mentioned sequence of processing operations is executed by software, the programs constituting the software are installed in a computer which is built in dedicated hardware equipment or installed, from a recording media, into a general-purpose personal computer for example in which various programs may be installed for the execution of various functions.

As shown in FIG. 8, program recording media for storing programs that are installed on a computer for execution is made up of the removable media 71 that are package media made up of a magnetic disk (including a flexible disk), an optical disk (including CD-ROM (Compact Disc-Read Only Memory), a DVD (Digital Versatile Disc), a magneto-optical disk, or a semiconductor memory, the ROM 62 in which programs are temporarily or permanently stored, or a hard disk drive that forms the storage section 68. Storing of programs into program recording media is executed by use of wired or wireless communication media, such as a local area network, the Internet, or digital satellite broadcasting, via the communication block 69 that provides an interface, such as a router and a modem, as required.

It should be noted herein that the steps for describing each program recorded in recording media include not only the processing operations which are sequentially executed in a time-dependent manner but also the processing operations which are executed concurrently or discretely.

It should also be noted that term "system" as used herein denotes an entire apparatus configured by a plurality of component units.

While preferred embodiments of the present invention have been described using specific terms, such description is for illustrative purpose only, and it is to be understood that changes and variations may be made without departing from the spirit or scope of the following claims.

The invention claimed is:

1. A recording method for recording content to be broadcast to an internal recording media and for copying the recorded content, the method comprising:

managing restrictive information to be obtained as attribute information associated with content recorded to the internal recording media, the restrictive information including a first attribute for specifying a copyable count and a second attribute for specifying a restriction to be added every time copying is executed, the second attribute including an attribute A and an attribute B; and adding, every time the content recorded to the internal recording media is copied within a range of the copyable count specified by the first attribute, a restriction specified by the second attribute to the content recorded to the internal recording media that provided a source of the copying, the content is copied without restriction if a copy count is within a copyable count specified by attribute A, and the content is copied with the restriction specified by the attribute B if a copy count is over the copyable count specified by the attribute A, the attribute A specifying whether or not there is a restriction on a period of time before the next copy is enabled, and the attribute B specifying the period of time before the next copy is enabled when the attribute A indicates that there is a restriction on the period of time before the next copy is enabled.

2. A non-transitory computer-readable storage medium encoded with a plurality of computer-executable instructions that, when executed, perform a method for recording content to be broadcast to an internal recording media and for copying the recorded content, the method comprising:

managing restrictive information to be obtained as attribute information associated with content recorded to the internal recording media, the restrictive information including a first attribute for specifying a copyable count and a second attribute for specifying a restriction to be added every time copying is executed, the second attribute including an attribute A and an attribute B; and adding, every time the content recorded to the internal recording media is copied within a range of the copyable count specified by the first attribute, a restriction specified by the second attribute to the content recorded to the internal recording media that provided a source of the copying, the content is copied without restriction if a copy count is within a copyable count specified by attribute A, and the content is copied with the restriction specified by the attribute B if a copy count is over the copyable count specified by the attribute A, the attribute A specifying whether or not there is a restriction on a period of time before the next copy is enabled, and the attribute B specifying the period of time before the next copy is enabled when the attribute A indicates that there is a restriction on the period of time before the next copy is enabled.

3. A providing method, comprising:

generating, as attribute information associated with each piece of content to be broadcast, restrictive information including a first attribute for specifying a copyable count and a second attribute for specifying a restriction to be added every time copying is executed, the second attribute including an attribute A and an attribute B ted; and providing the restrictive information with each piece of the content by broadcasting to a recording apparatus that records each piece of the content to be broadcast to an internal recording media and copies the recorded content, the content is copied without restriction if a copy count is within a copyable count specified by attribute A, and the content is copied with the restriction specified by the attribute B if a copy count is over the copyable count specified by the attribute A, the attribute A specifying whether or not there is a restriction on a period of time before the next copy is enabled, and the attribute B specifying the period of time before the next copy is enabled when the attribute A indicates that there is a restriction on the period of time before the next copy is enabled.

4. A non-transitory computer-readable storage medium encoded with a plurality of computer-executable instructions that, when executed, perform a providing method, the method comprising:

generating, as attribute information associated with each piece of content to be broadcast, restrictive information including a first attribute for specifying a copyable count and a second attribute for specifying a restriction to be added every time copying is executed, the second attribute including an attribute A and an attribute B; and providing the restrictive information with each piece of the content by broadcasting to a recording apparatus that records each piece of the content to be broadcast to an internal recording media and copies the recorded content, the content is copied without restriction if a copy count is within a copyable count specified by attribute A, and the content is copied with the restriction specified by the attribute B if a copy count is over the copyable count specified by the attribute A, the attribute A specifying whether or not there is a restriction on a period of time before the next copy is enabled, and the attribute B specifying the period of time before the next copy is enabled when the attribute A indicates that there is a restriction on the period of time before the next copy is enabled.

5. A method for recording content to be broadcast to an internal recording media and copying the recorded content, comprising:

managing restrictive information to be obtained as attribute information associated with content recorded to the internal recording media, the restrictive information including a first attribute for specifying a copyable count and a second attribute including an attribute A for specifying another copyable count which is within the range of the first attribute, and an attribute B for specifying restriction to be added every time copying is executed, and adding, every time the content recorded to the internal recording media is copied within a range of the copyable count specified by the first attribute, the restriction specified by the second attribute to each piece of the content recorded to the internal recording media that provided a source of the copying, the content is copied without restriction if a copy count is within the copyable count specified by attribute A, and the content is copied with the restriction specified by the attribute B if a copy count is over the copyable count specified by the attribute A, the attribute A specifying whether or not there is a restriction on a period of time before the next copy is enabled, and the attribute B specifying the period of time before the next copy is enabled when the attribute A indicates that there is a restriction on the period of time before the next copy is enabled.

6. A non-transitory computer-readable storage medium encoded with a plurality of computer-executable instructions that, when executed, perform a method for recording content to be broadcast to an internal recording media and copying the recorded content, the method comprising:

managing restrictive information to be obtained as attribute information associated with content recorded to the internal recording media, the restrictive information including a first attribute for specifying a copyable count and a second attribute including an attribute A for specifying another copyable count which is within the range of the first attribute, and an attribute B for specifying restriction to be added every time copying is executed, and adding, every time the content recorded to the internal recording media is copied within a range of the copyable count specified by the first attribute, the restriction specified by the second attribute to each piece of the content recorded to the internal recording media that provided a source of the copying, the content is copied without restriction if a copy count is within the copyable count specified by attribute A, and the content is copied with the restriction specified by the attribute B if a copy count is over the copyable count specified by the attribute A, the attribute A specifying whether or not there is a restriction on a period of time before the next copy is enabled, and the attribute B specifying the period of time before the next copy is enabled when the attribute A indicates that there is a restriction on the period of time before the next copy is enabled.

* * * * *